United States Patent [19]

Takamura

[11] Patent Number: 5,730,480
[45] Date of Patent: Mar. 24, 1998

[54] LOCK DEVICE FOR RETRACTABLE AUTOMOTIVE SEAT

[75] Inventor: Noboru Takamura, Yokohama, Japan

[73] Assignee: Ohi Seisakusho Co., Ltd., Yokohama, Japan

[21] Appl. No.: 594,520

[22] Filed: Jan. 31, 1996

[30] Foreign Application Priority Data

Feb. 16, 1995 [JP] Japan ................... 7-028105
Mar. 27, 1995 [JP] Japan ................... 7-067757

[51] Int. Cl.[6] .................................................. B60N 2/14
[52] U.S. Cl. ............ 296/65.1; 297/326; 248/503.1; 292/217; 292/341.12; 292/DIG. 73
[58] Field of Search ............... 296/65.1; 297/326, 297/331, 335, 336; 248/503.1; 292/108, 217, 341.12, DIG. 73

[56] References Cited

U.S. PATENT DOCUMENTS

| | | | |
|---|---|---|---|
| 4,759,580 | 7/1988 | Berklich, Jr. et al. | 296/65.1 |
| 4,765,682 | 8/1988 | Satoh | 297/379 |
| 4,770,459 | 9/1988 | Nakaiwa et al. | |
| 4,773,693 | 9/1988 | Premji et al. | 296/65.1 |
| 4,865,377 | 9/1989 | Musser et al. | 248/503.1 X |
| 4,869,536 | 9/1989 | Kleefeldt | 292/DIG. 73 |
| 4,971,379 | 11/1990 | Rumpel et al. | 297/336 X |
| 5,383,699 | 1/1995 | Woziekonski et al. | 296/65.1 |

FOREIGN PATENT DOCUMENTS

| | | |
|---|---|---|
| 2-33563 | 9/1990 | Japan. |
| 6-25511 | 4/1994 | Japan. |

*Primary Examiner*—Dennis H. Pedder
*Attorney, Agent, or Firm*—Foley & Lardner

[57] ABSTRACT

A lock device has a striker and a lock proper. The lock proper includes a base member having a striker receiving slot into which the striker can be led. A latch plate is pivotally connected to the base member. A locking plate is pivotally connected to the base member. A striker restraining member is pivotally connected through a pivot shaft to the base member. The striker restraining member is pivotal between a restraining position, where a contact edge thereof abuts against the striker, and a releasing position, where the contact edge disengages from the striker. Springs are employed for biasing the latch plate to pivot toward a stand-by position, biasing the locking plate to pivot toward a lock position, and biasing the striker restraining member to pivot toward the restraining position. A link mechanism is employed for causing the striker restraining member to take the restraining position when the latch plate and the locking plate take latching and lock positions respectively. The pivot shaft of the striker restraining member is positioned at the back of the striker receiving slot, so that the contact edge of the striker restraining member can abut against a front side of the striker.

18 Claims, 9 Drawing Sheets

LOCK DEVICE FOR RETRACTABLE AUTOMOTIVE SEAT

BACKGROUND OF THE INVENTION

1. Field of the Invention

The present invention relates in general to lock devices, and more particularly to lock devices for retractable automotive seats.

2. Description of the Prior Art

Among automotive seats, especially seats for a van-type motor vehicle, there is a retractable type, which can be retracted when not in use. That is, in case where the vehicle needs a much larger luggage space, the retractable seat is folded up for permitting the seat space to be used as an extra luggage space. In these retractable automotive seats, a lock device is employed for locking the in-use position of the seat. Usually, the lock device comprises a striker mounted to one of the seat and the vehicle floor, and a latch device mounted to the other for latching the striker when the seat is in the in-use position.

Various types of lock devices for such retractable seats have been proposed and put into practical use, some of which are shown in Japanese Patent Second Provisional Publication 6-25511 and Japanese Utility Model First Provisional Publication 2-33563.

However, due to inherent construction, some have failed to give users satisfaction. In fact, they tend to produce noise when practically used. Furthermore, a marked manual force is needed when canceling of the engagement between the striker and the latch device is carried out.

SUMMARY OF THE INVENTION

It is therefore an object of the present invention to provide a lock device for retractable automotive seat, which is free of the above-mentioned drawbacks.

According to the present invention, there is provided a lock device including a striker and a lock proper. The lock proper comprises a base member having a striker receiving slot into which the striker can be led; a latch plate pivotally connected to the base member, the latch plate being pivotal between a latching position, where the latch plate latches the striker in the striker receiving slot, and a stand-by position where the latch plate releases the striker; a locking plate pivotally connected to the base member, the locking plate being pivotal between a lock position where the locking plate locks the latch plate in the latching position and an unlock position where the locking plate unlocks the latch plate; a striker restraining member pivotally connected through a pivot shaft to the base member, the striker restraining member being pivotal between a restraining position where a contact edge thereof abuts against the striker and a releasing position where the contact edge disengages from the striker; biasing means for biasing the latch plate to pivot toward the stand-by position, biasing the locking plate to pivot toward the lock position, and biasing the striker restraining member to pivot toward the restraining position; and link means for causing the striker restraining member to take the restraining position when the latch plate and the locking plate take the latching and lock positions respectively, wherein the pivot shaft of the striker restraining member is positioned at the back of the striker receiving slot, so that the contact edge of the striker restraining member can abut against a front side of the striker.

BRIEF DESCRIPTION OF THE DRAWINGS

Other objects and advantages of the present invention will become apparent from the following description when taken in conjunction with the accompanying drawings, in which.

DESCRIPTION OF THE EMBODIMENTS

Figure 15:
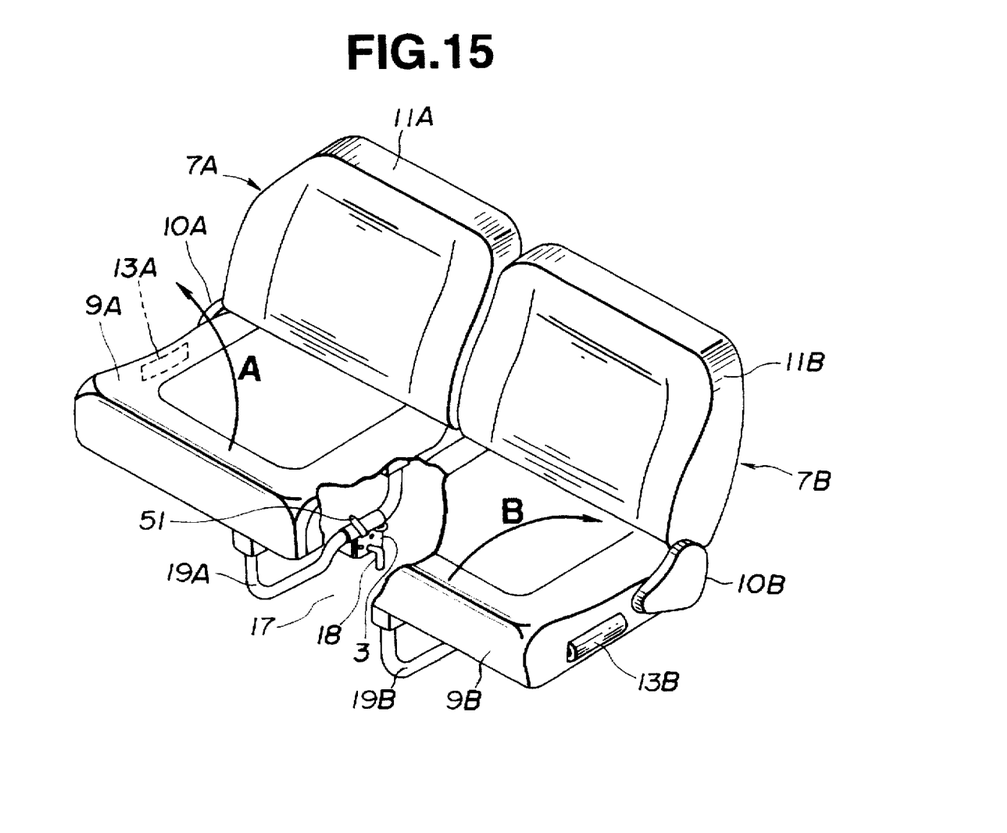
FIG. 15 is a perspective view of two retractable seats to which the present invention is practically applied.

Referring to FIG. 15, there are shown two retractable seats 7A and 7B to each of which a lock device of the present invention is practically applied.

These seats 7A and 7B are arranged to pivot in the directions of the arrows "A" and "B" respectively. Each seat 7A or 7B comprises generally a seat cushion 9A or 9B, a seatback 11A or 11B, and a pivot mechanism 10A or 10B through which the seatback 11A or 11B is pivotally connected to a rear end of the seat cushion 9A or 9B. With the pivot mechanism 10A or 10B, the seatback 11A or 11B can take a raised in-use position as shown and a folded not-in-use position. Although not shown, in the folded position, the seatback 11A or 11B is laid or flatly put on the seat cushion 9A or 9B.

The seat cushion 9A or 9B is provided at its outer side with a conventional hinge 13A or 13B through which the seat 7A or 7B can pivot outward in the illustrated directions "A" and "B". Although not shown in the drawing, the hinges 13A and 13B are mounted to opposed side walls of a vehicle body.

Each seat cushion 9A or 9B is equipped at a bottom thereof with a foldable stand 19A or 19B through which the seat 7A or 7B can be supported on a vehicle floor 17 (viz., floor panel).

As shown, the foldable stand 19A or 19B is a generally U-shaped metal pipe, which comprises an elongate base part that abuts against the vehicle floor 17 and two shank parts, which have upper ends hinged to the bottom surface of the seat cushion 9A or 9B. That is, when in use, the stand 19A or 19B takes the illustrated projected position, while, when not in use, the stand 19A or 19B is folded onto the bottom face of the seat cushion 9A or 9B. The elongate base part of the stand 19A or 19B is formed with a depressed portion, as shown, for mounting thereto an after-mentined lock proper.

As will become apparent as the description proceeds, the lock device of the present invention is used for keeping the stand 19A or 19B in the projected condition, that is, for locking the projected stand relative to the vehicle floor 17.

Figure 1:
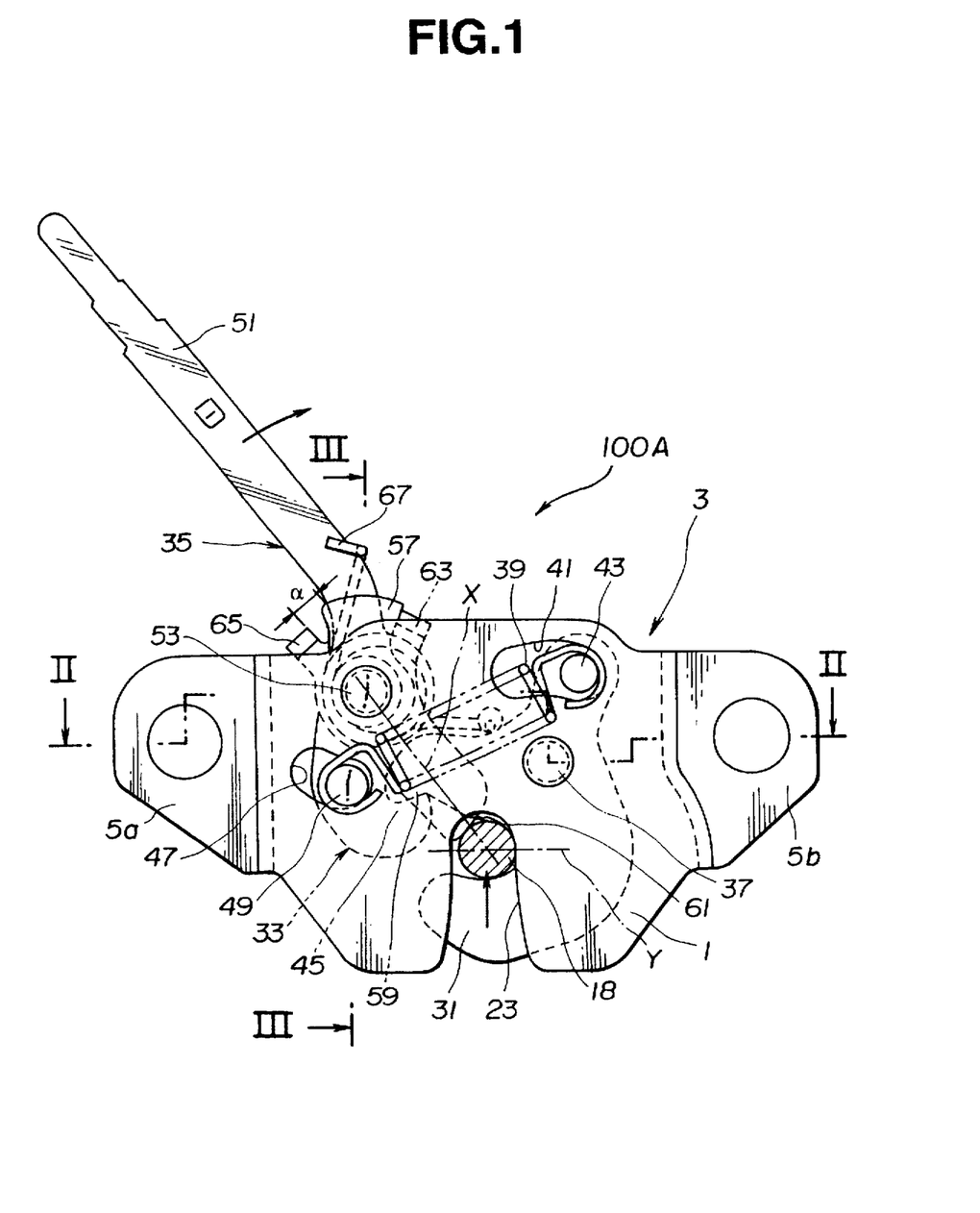
FIG. 1 is a front view of a first embodiment of a lock device of the present invention.
Figure 2:
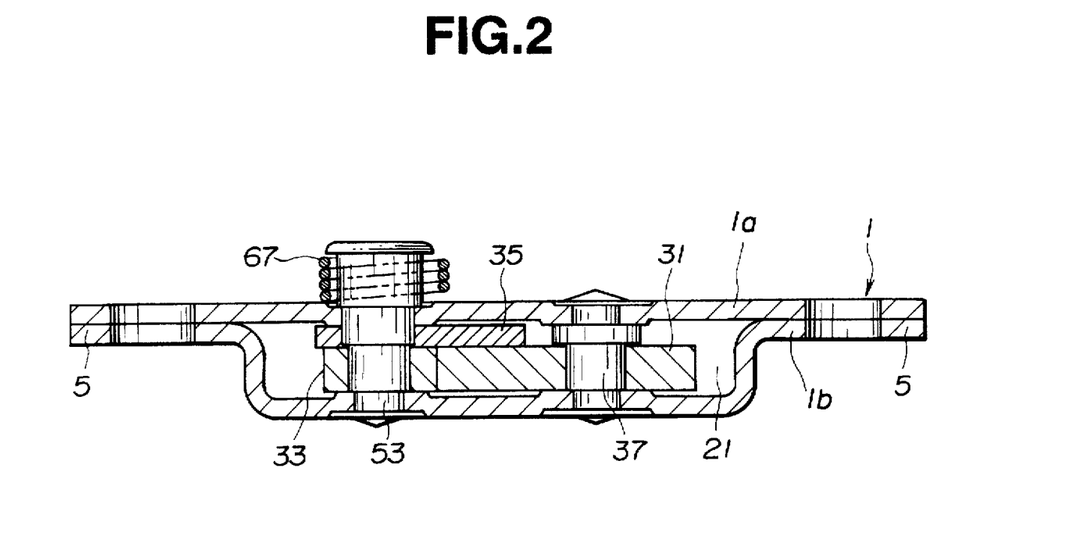
FIG. 2 is a sectional view taken along the line II—II of FIG. 1.
Figure 3:
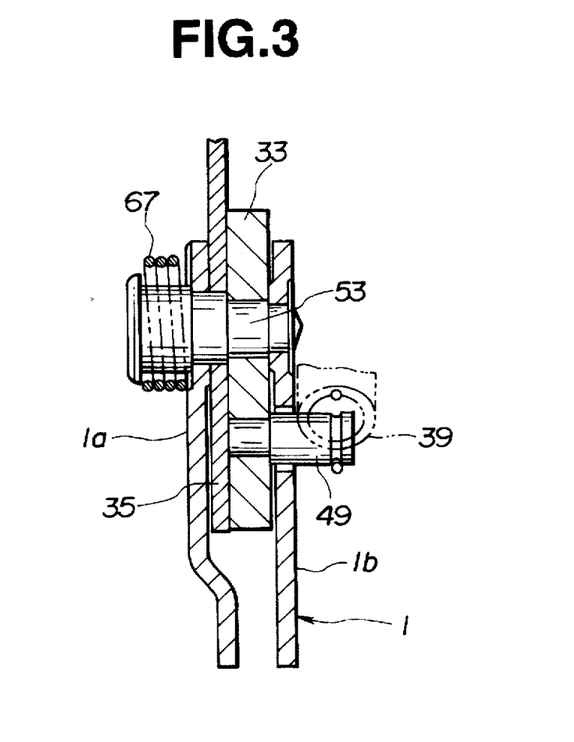
FIG. 3 is a sectional view taken along the line III—III of FIG. 1.

Referring to FIGS. 1 to 8, particularly FIGS. 1 to 3, there is shown a lock device 100A of a first embodiment of the present invention. For ease of description, the following explanation will be directed to only a case where the lock device 100A is applied to the seat 7A.

The lock device 100A generally comprises a striker 18 fixed to the vehicle floor 17 and a lock proper 3 which is mounted to the foldable stand 19A of the seat 7A. As will become apparent as the description proceeds, the lock proper 3 is constructed and arranged to catch or latch the striker 18 when the seat 7A is pivoted down to assumes its in-use position as shown in FIG. 15.

As best seen from FIG. 1, the lock proper 3 comprises a generally triangular base member 1 having two flange portions 5a and 5b through which the base member 1 is bolted to the depressed portion (see FIG. 15) of the elongate base part of the stand 19A.

As understood from FIG. 2, the base member 1 comprises a flat plate 1a and a depressed plate 1b which are combined to define therebetween a space 21.

As understood from FIG. 1, the base member 1 is formed at a lower portion with a striker receiving slot 23 merged with the space 21.

Within the space 21, there are pivotally installed a latch plate 31 and a locking plate 33. That is, the latch plate 31 and the locking plate 33 are pivotally disposed about respective pivot shafts 37 and 53 which extend between the two plates 1a and 1b of the base member 1.

Figure 7:
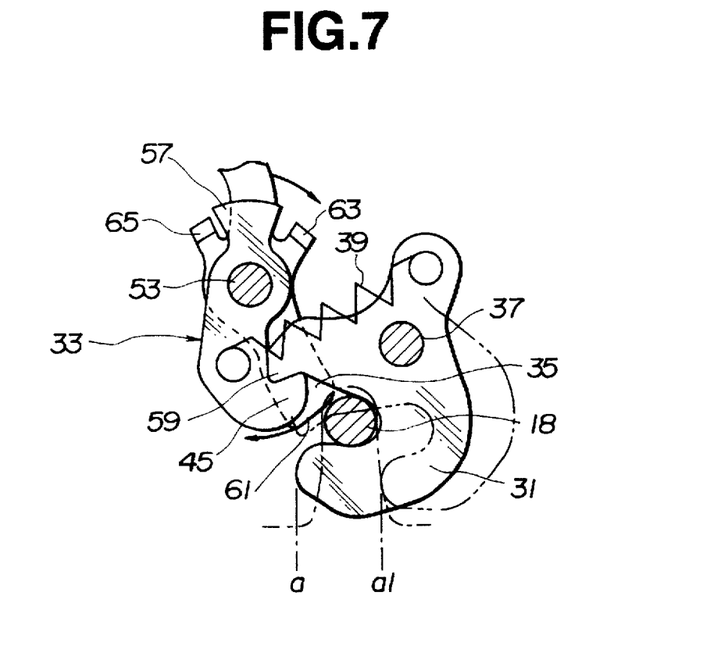

As seen from FIG. 7, the latch plate 31 can pivot between a striker latching position as shown by a solid line "a" and a stand-by position as shown by a phantom line "a1". Due to force of an after-mentioned biasing spring 39, the latch plate 31 is biased toward the stand-by position "a1".

Figures 4, 5:
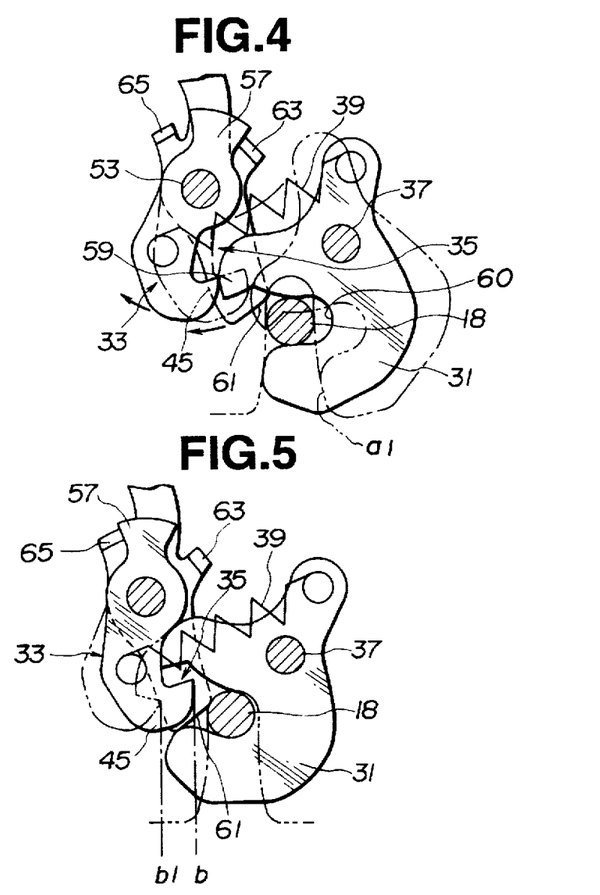
FIGS. 4 to 8 are front views of an essential portion of the lock device of the first embodiment, showing different conditions of the same respectively.

As seen from FIG. 5, the locking plate 33 can pivot between an unlock position as shown by a phantom line "b1" and a lock position as shown by a solid line "b". Due to the force of the biasing spring 39, the locking plate 33 is biased toward the lock position "b".

As understood from FIG. 1, the biasing spring 39 is arranged outside of the base member 1, that is, outside of the depressed plate 1b of the base member 1. The depressed plate 1b is formed with two arcuate openings 41 and 47, which are concentric with the shafts 43 and 53 respectively. A first pin 43 is secured to the latch plate 31, which extends to the outside through the arcuate opening 41, and a second pin 49 is secured to the locking plate 33, which extends to the outside through the arcuate opening 47. The biasing spring 39 has one end hooked to the first pin 43 and the other end hooked to the second pin 49.

It is to be noted that each of the latch plate 31 and the locking plate 33 can pivot about the shaft 43 or 53 by an angle determined by the movement of the pin 43 or 49 allowed in the arcuate slot 41 or 47.

Figure 8:
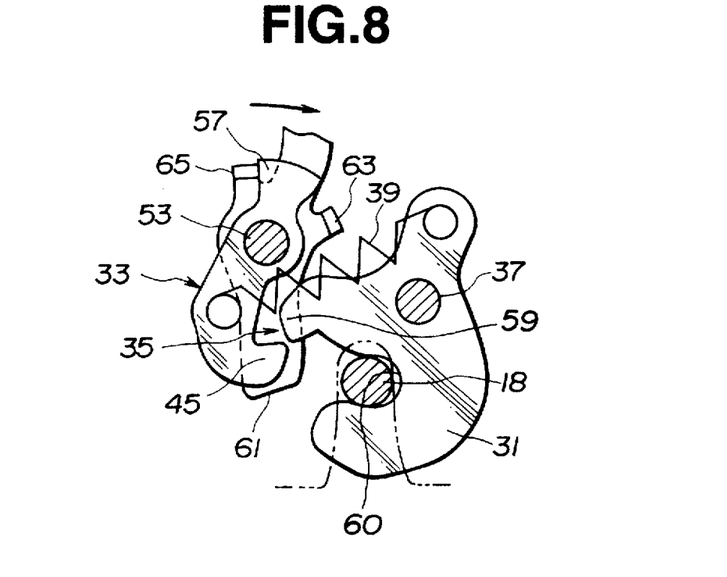

As best seen from FIG. 8, the latch plate 31 comprises a pawl portion 59 engageable with the locking plate 33 and a rounded recess 60, which can receive therein the striker 18. While, the locking plate 33 comprises a pawl portion 45 engageable with the latch plate 31 and a sector upper portion 57. The pawl portion 45 and the sector portion 57 are located at opposite positions with respect to the pivot shaft 53.

Figure 6:
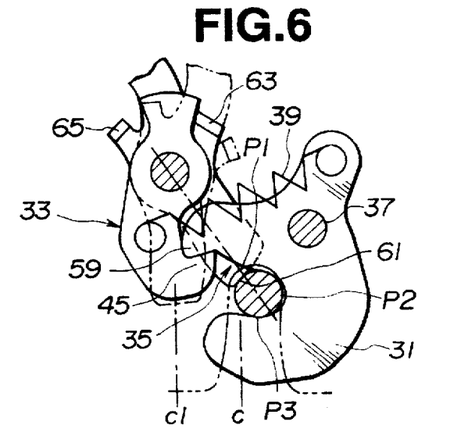

As understood from FIGS. 4, 5 and 6, due to the force of the biasing spring 39, the locking plate 33 is biased toward the lock position "b" where the pawl portion 45 thereof is operatively engageable with the pawl portion 59 of the latch plate 31.

As seen from FIGS. 1 and 2, an operation lever 51 is further employed, which has a striker restraining base portion 35 pivotally disposed about the pivot shaft 53 of the locking plate 33.

Figure 16:
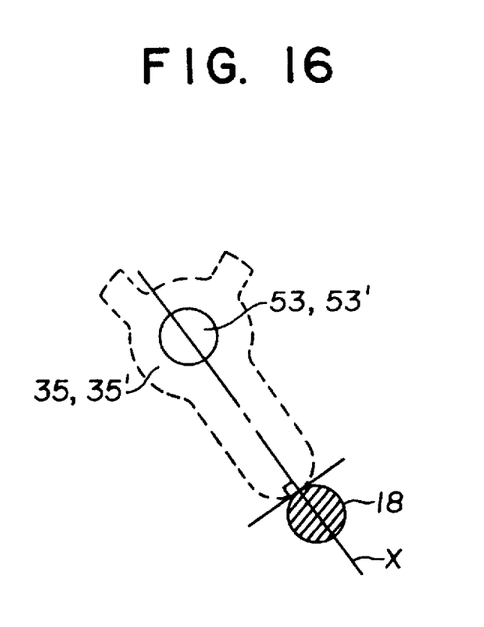
FIG. 16 is a schematic view showing the cooperation between the striker and a convex lower edge of the striker restraining base portion.

As best seen from FIG. 8 and 16, the striker restraining base portion 35 has a curved lower edge 61 and has at portions just above the pivot shaft 53 first and second raised lugs 63 and 65 between which the sector portion 57 of the locking plate 33 is positioned as shown. The curved lower edge 61 of the striker restraining base portion 35 can abut against the striker 18 when the latter is fully latched by the latch plate 31.

As seen from FIG. 6, the striker restraining base portion 35 (viz., the operation lever 51) can pivot between a restraining position as shown by a solid line "c" and a releasing position as shown by a phantom line "c1".

As seen from FIG. 1, the pivot shaft 53 is positioned above the depth of the striker receiving slot 23 of the base member 1. More specifically, the pivot shaft 53 is located above an imaginary line "Y" passing through the center of the striker 18 in latched condition and is perpendicular to the direction in which the striker 18 travels in the striker receiving slot 23.

As understood from FIG. 1, when the striker restraining base portion 35 of the operation lever 51 is in the restraining position "c" (see FIG. 6), there is left a given space "α" between the second raised lug 65 and the sector portion 57. When, thereafter, the operation lever 51 is pivoted clockwise by an angle corresponding to the given space "α", the second raised lug 65 is brought into abutment with the sector portion 57 of the locking plate 33 and pushes the same. Thus, during the clockwise pivoting of the operation lever 51 from the restraining position "c", separation of the curved lower edge 61 of the striker restraining base portion 35 from the striker 18 takes place first and then lock canceling pivoting of the locking plate 33 takes place. That is, a so-called "time-lug operation" is carried out between the striker restraining base portion 35 and the locking plate 33.

As seen from FIGS. 1 to 3, a spiral spring 67 is disposed about an exposed part of the pivot shaft 53 to bias the operation lever 51 counterclockwise in FIG. 1, that is, toward the restraining position "c".

As seen from FIG. 1 and 16 under the illustrated condition wherein the striker 18 is fully latched by the latch plate 31 and the striker restraining base portion 35 of the operation lever 51 assumes the restraining position "c", the curved lower edge 61 of the striker restraining base portion 35 intersects at right angles with an imaginary straight line "X" passing through the centers of the striker 18 and the pivot shaft 53.

In the following, operation of the lock device 100A will be described with reference to the drawings. For ease of understanding, the description will be commenced with respect to a rest condition of the lock device 100A, where the lock proper 3 is separated from the striker 18. Such rest condition takes place when, for example, the seat 7A (see FIG. 15) is folded up on the side wall (not shown) of the vehicle.

Under the rest condition, the latch plate 31 of the lock proper 3 takes the stand-by position "a1" (see FIG. 4), the pawl portion 45 of the locking plate 33 is put on a rounded back of the pawl portion 59 of the latch plate 31 and the striker restraining base portion 35 of the operation lever 51 takes the restraining position "c" (see FIG. 6). Due to biasing force generated by the springs 39 and 67, the parts 31, 33, and 51 are biased in respective given directions and thus stationarily held.

When, upon setting of the stand 19A (see FIG. 15) of the seat 7A on the vehicle floor 17, the striker 18 on the floor 17 enters the striker receiving slot 23 of the lock proper 3, the striker 18 is guided into the rounded recess 60 of the latch plate 31 and pushes an upper edge of the recess 60 against the force of the spring 39. With this, as seen from FIG. 4, the latch plate 31 pivots clockwise about the pivot shaft 37 from the stand-by position "a1" while pushing, at the back of the pawl portion 59, the locking plate 33 to pivot outward (viz., clockwise) about the pivot shaft 53. The clockwise pivoting of the locking plate 33 brings about abutment of the sector portion 57 with the first raised lug 63, so that the striker restraining base portion 35 is pivoted outward (viz., clockwise) a little from the restraining position "c". When, as seen from FIG. 5, the clockwise pivoting of the latch plate 31 exceeds a certain degree, the pawl portion 45 of the locking plate 33 falls into the entrance of the rounded recess 60 of the latch plate 31 causing a return pivoting of the locking plate 33 with the aid of the spring 39. Upon this, as seen from FIG. 6, the latch plate 31 is pivoted back (that is, counterclockwise) a little by the force of the spring 39, resulting in that the pawl portion 59 of the latch plate 31 fully engages with the pawl portion 45 of the locking plate 33. Following this, the operation lever 51 is pivoted back to the restraining position "c" due to the force of the spring 67. Under this condition, the latch plate 31 catching the striker 18 is suppressed from pivoting toward the stand-by position and the curved lower edge 61 of the operation lever 51 tightly abuts against the striker 18, as shown in FIG. 1. That is, under this condition, the striker 18 is completely locked by the lock proper 3, as shown in FIG. 1.

As understood from FIG. 6, under this locked condition, the striker 18 is stably supported by three points P1, P2, and P3. That is, the point P1 is defined by the curved lower edge 61 of the operation lever 51, and the points P2 and P3 are defined by the peripheral edge of the rounded recess 60 of the latch plate 31. This means that, under the locked condition, the lock proper 3 is tightly held by the striker 18 without play. Thus, as is understood from FIG. 15, the seat 7A assuming in-use position is stationarily held on the vehicle floor 17 without play.

When, for the purpose of folding up the seat 7A, the operation lever 51 is pivoted clockwise in FIG. 1, the curved lower edge 61 of the operation lever 51 is disengaged from the striker 18. As is seen from FIG. 7, at initial stage of the disengaging pivoting of the operation lever 51, the locking plate 33 is kept unmoved because of the given distance "α" (see FIG. 1) left between the second raised lug 65 and the sector portion 57. That is, at the initial stage, the latched engagement between the latch plate 31 and the locking plate 33 is kept and thus the latched engagement between the latch plate 31 and the striker 18 is also kept.

When the clockwise pivoting of the operation lever 51 further proceeds, the second raised lug 65 is brought into abutment with the sector portion 57 of the locking plate 33 and pushes the same. With this, as seen from FIG. 8, the locking plate 33 is pivoted clockwise disengaging the pawl portion 45 thereof from the pawl portion 59 of the latch plate 31, and thus, with the aid of the force of the spring 39, the latch plate 31 is permitted to pivot toward the stand-by position "a1" releasing the striker 18. Thus, under this condition, the stand 19A (see FIG. 15) of the seat 7A is released from the striker 18 and thus the seat 7A can be folded up.

When thereafter the operation lever 51 is released, the lock device 100A assumes the above-mentioned rest condition.

In the following, advantages of the lock device 100A of the first embodiment will be described.

(1) Due to provision of the striker restraining base portion 35, the locked engagement between the striker 18 and the lock proper 3 is steadily and reliably made without play.

(2) During operation of the operation lever 51 for canceling engagement between the lock proper 3 and the striker 18, separation of the striker restraining base portion 35 from the striker 18 takes place first and then lock canceling pivoting of the locking plate 33 takes place. Thus, smoothed pivoting of the operation lever 51 is achieved with a light force.

(3) The locking plate 33 and the striker restraining base portion 35 are mounted pivotally on the common pivot shaft 53. This induces a compact construction of the lock proper 3.

Figure 9:
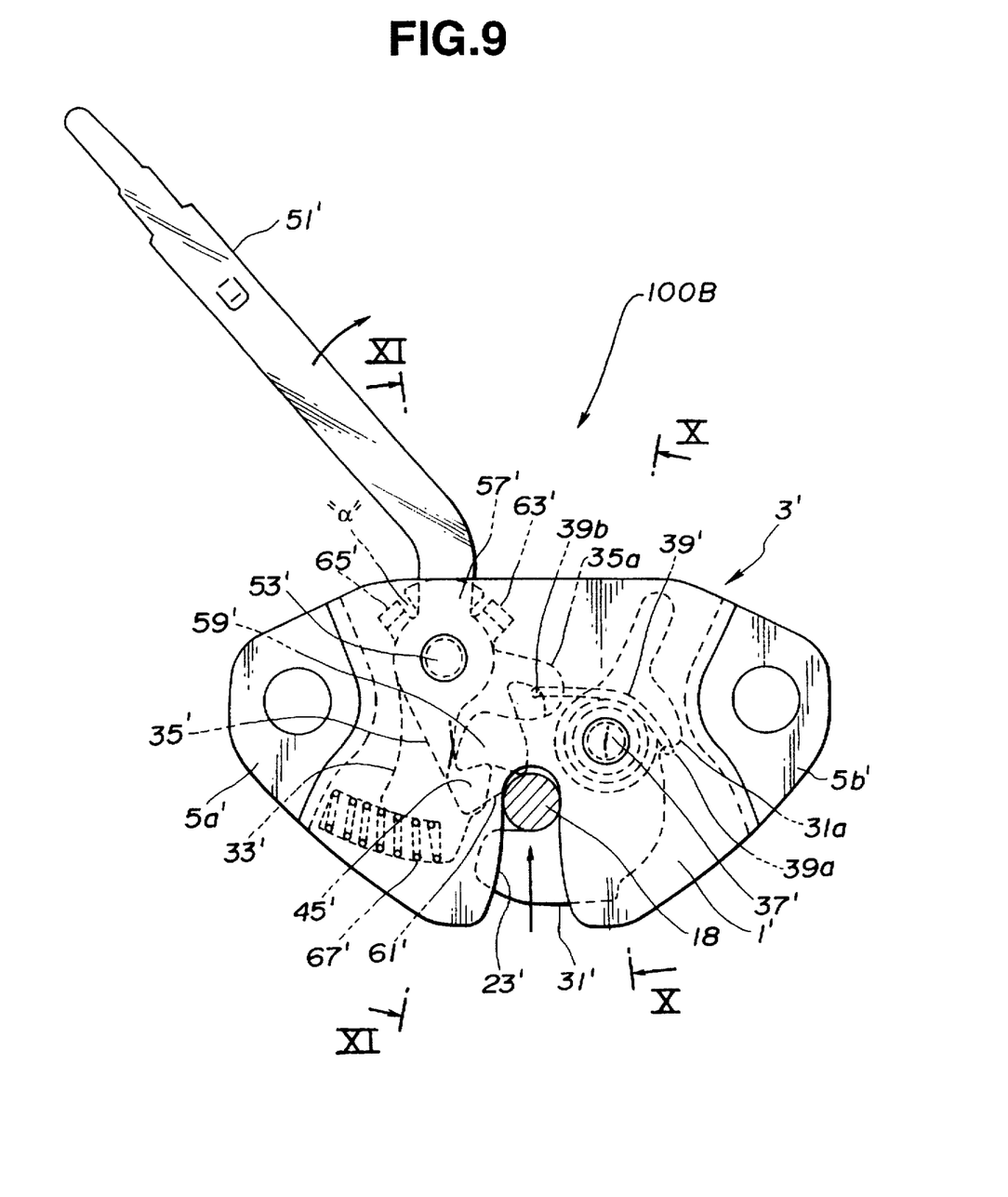
FIG. 9 is a front view of a second embodiment of a lock device of the present invention.
Figure 10:
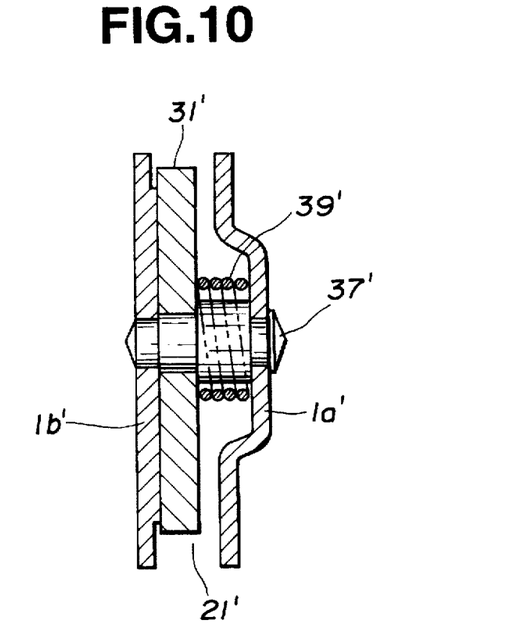
FIG. 10 is a sectional view taken along the line X—X of FIG. 9.
Figure 11:
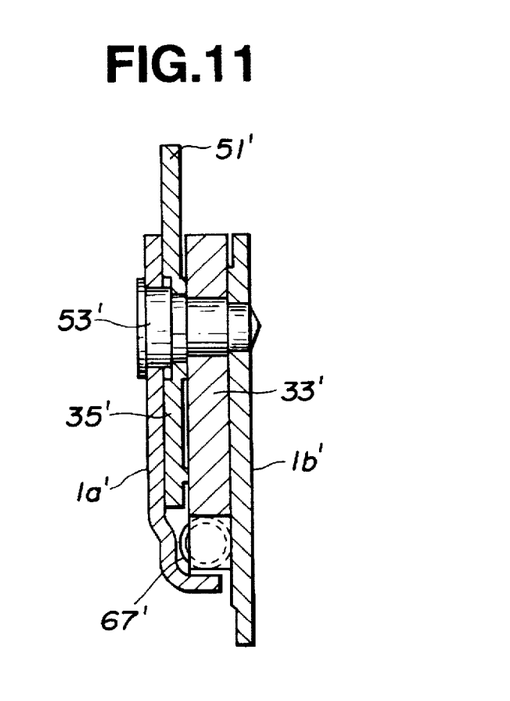
FIG. 11 is a sectional view taken along the line XI—XI of FIG. 9.

Referring to FIGS. 9 to 14, particularly FIGS. 9 to 11, there is shown a lock device 100B of a second embodiment of the present invention. For ease of description, the following explanation will be directed to the case wherein the lock device 100B is applied to the seat 7A (see FIG. 15).

The lock device 100B generally comprises a striker 18, which is fixed to the vehicle floor 17, and a lock proper 3' which is mounted to the foldable stand 19A of the seat 7A.

As best seen from FIG. 9, the lock proper 3' comprises a generally triangular base member 1' having two flange portions 5a' and 5b' through which the base member 1' is bolted to the depressed portion (see FIG. 15) of the elongate base part of the stand 19A.

As understood from FIGS. 10 and 11, the base member 1' comprises a flat plate 1b' and a depressed plate 1a' which are combined to define therebetween a space 21'.

As understood from FIG. 9, the base member 1' is formed at a lower portion with a striker receiving slot 23' which is merged with the space 21'.

Within the space 21', there are pivotally installed a latch plate 31' and a locking plate 33'. That is, the latch plate 31' and the locking plate 33' are pivotally disposed about respective pivot shafts 37' and 52' which extend between the two plates 1a' and 1b' of the base member 1'.

Figure 12:
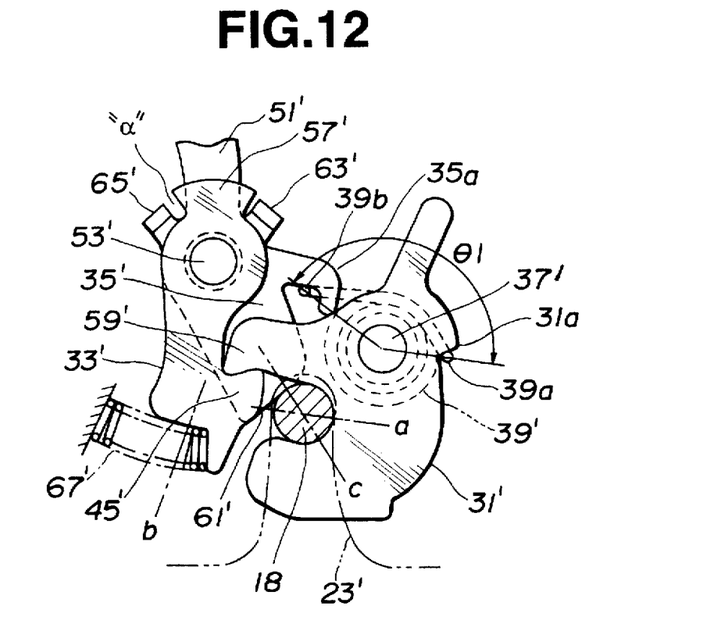
FIGS. 12 to 14 are front views of an essential portion of the lock device of the second embodiment, showing different conditions of the same respectively.
Figure 13:
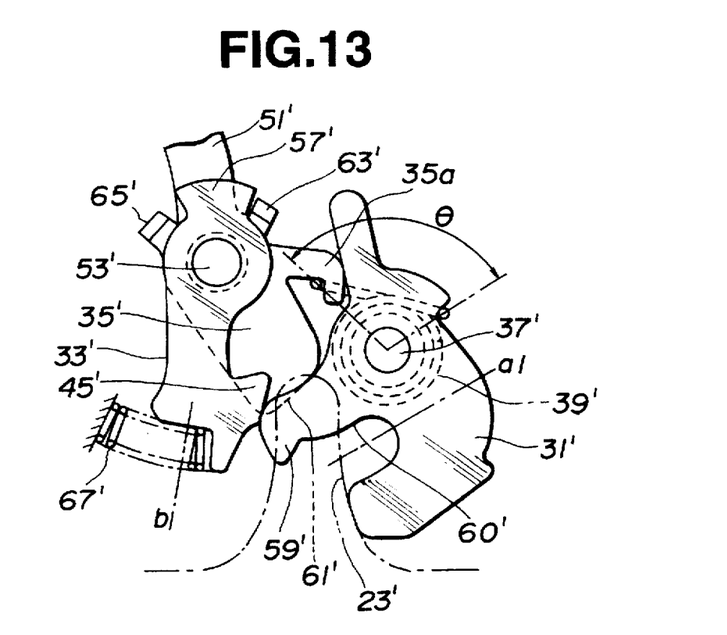

As seen from FIGS. 12 and 13, the latch plate 31' can pivot between a striker latching position "a" as shown in FIG. 12 and a stand-by position "a1" as shown in FIG. 13. Due to force of a biasing spring 39', the latch plate 31' is biased toward the stand-by position "a1".

Figure 14:
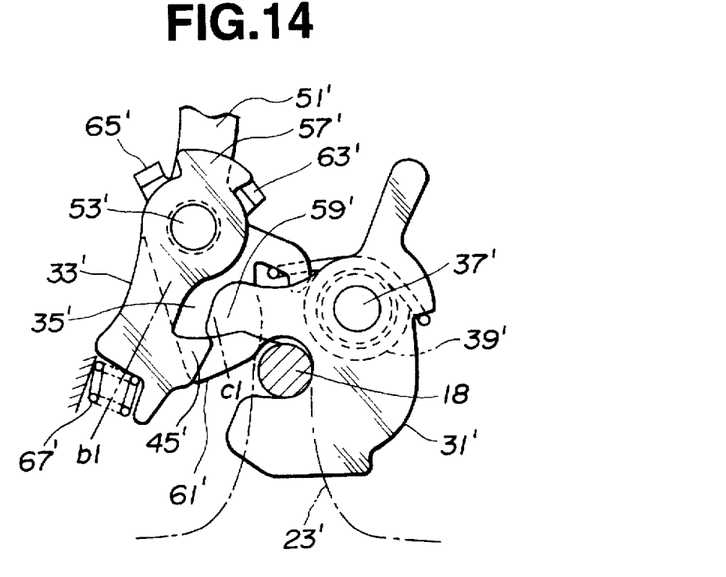

As seen from FIGS. 12 and 14, the locking plate 33 can pivot between an unlock position "b1" as shown in FIG. 14 and a lock position "b" as shown in FIG. 12. Due to force of an a spring 67', the locking plate 33' is biased toward the lock position "b".

As understood from FIGS. 9 and 10, the biasing spring 39' is of a spiral type, which is arranged in the space 21' of the base member 1' and disposed about the pivot shaft 37' of the latch plate 31'. One end 39a of the spring 39' is hooked to a shoulder portion 31a of the latch plate 31', and the other end 39b of the spring 39' is hooked to an arm 41' of a striker restraining base portion 35' of an operation lever 51'.

As understood from FIGS. 12 and 13, when the angle defined by the ends 39a and 39b of the spiral spring 39' increases from "θ" (see FIG. 13) to "θ1" (see FIG. 12), energy is stored in the spring 39', by which the latch plate 31' is biased toward the stand-by position "a1".

As best seen from FIG. 13, the latch plate 31' comprises a pawl portion 59' engageable with the locking plate 33' and a rounded recess 60' which can receive therein the striker 18. While, the locking plate 33' comprises a pawl portion 45' engageable with the latch plate 31' and a sector upper portion 57'. The pawl portion 45' and the sector portion 57' are located at opposite positions with respect to the pivot shaft 53'.

As understood from FIGS. 9, 11, and 12, a coil spring 67' is compressed between the base member 1' and the locking plate 33' to bias the latter toward the lock position "b" where the pawl portion 45' of the locking plate 33' is engageable with the pawl portion 59' of the latch plate 31'.

As seen in FIG. 9, an operation lever 51' is further employed, which has the striker restraining base portion 35' which is pivotally disposed about the pivot shaft 53' of the locking plate 33'.

As best seen from FIG. 14, the striker restraining base portion 35' has a curved lower edge 61' and has at portions just above the pivot shaft 53' first and second raised lugs 63' and 65' between which the sector portion 57' of the locking plate 33' is positioned as shown. The curved lower edge 61' can abut against the striker 18 when the latter is fully latched by the latch plate 31'.

As seen from FIGS. 12 and 14, the striker restraining base portion 35' (viz., the operation lever 51') can pivot between a restraining position "c" as shown in FIG. 12 and a releasing position "c1" as shown in FIG. 14.

As understood from FIG. 9, the pivot shaft 53' is positioned above the depth of the striker receiving slot 23' of the base member 1'. More specifically, the pivot shaft 53' is located above an engaging position where the latch plate 31' can fully latch the striker 18.

As understood from FIG. 12, when the striker restraining base portion 35' of the operation lever 51' is in the restraining position "c", there is left a given distance "α" between the second raised lug 65' and the sector portion 57'. When, thereafter, the operation lever 51' is pivoted clockwise by an angle corresponding to the given space "α", the second raised lug 65' is brought into abutment with the sector portion 57' of the locking plate 33' and pushes the same. Thus, during the clockwise pivoting of the operation lever 51' from the restraining position "c", separation of the curved lower edge 61' of the striker restraining base portion 35' from the striker 18 takes place first and then lock canceling pivoting of the locking plate 33' takes place. That is, a so-called "time-lug operation" is carried out between the striker restraining base portion 35' and the locking plate 32'.

In the following, operation of the lock device 100B will be described with reference to the drawings. For ease of understanding, the description will be commenced with respect to a rest condition of the lock device 100B where the lock proper 3' is separated from the striker 18. Such rest condition takes place when, for example, the seat 7A (see FIG. 15) is folded up on the side wall of the vehicle.

Under the rest condition, the lock proper 3' assumes such a condition as shown in FIG. 13. That is, the latch plate 31' of the lock proper 3' takes the stand-by position "a1", the pawl portion 45' of the locking plate 33' is put on a rounded back of the pawl portion 59' of the latch plate 31' and the operation lever 51' takes the restraining position "c"(see FIG. 12). Due to biasing force generated by the springs 39' and 67', the parts 31', 33' and 51' are biased in respective directions and thus stationarily held.

When, upon setting of the stand 19A (see FIG. 15) of the seat 7A on the vehicle floor 17, the striker 18 on the floor 17 enters the striker receiving slot 23' of the lock proper 3', the striker 18 is guided into the rounded recess 60' of the latch plate 31' and pushes an upper edge of the recess 60' against the force of the spring 39'. With this, as seen from FIG. 14, the latch plate 31' pivots clockwise about the pivot shaft 37' from the stand-by position "a1" while pushing, at the back of the pawl portion 59', the locking plate 33' to pivot clockwise about the pivot shaft 53'. The clockwise pivoting of the locking plate 33' brings about abutment of the sector portion 57' with the first raised lug 63' (see FIG. 13), so that the striker restraining base portion 35' is pivoted outward (viz., clockwise) a little from the restraining position "c". When, as seen from FIG. 12, the clockwise pivoting of the latch plate 31' exceeds a certain degree, the pawl portion 45' of the locking plate 33' falls into the entrance of the rounded recess 60' of the latch plate 31' causing a return pivoting of the locking plate 33' with the aid of the spring 67'. More specifically, in initial stage of the return pivoting of the locking plate 33', the return movement is aided by also the helical spring 39' via the biasing engagement between the sector portion 57' and the first raised lug 63'. In response to the return pivoting of the locking plate 33', the latch plate 31' is pivoted back a little by the force of the helical spring 39', resulting in that the pawl portion 59' of the latch plate 31' fully engages with the pawl portion 45' of the locking plate 33'. Following this, the operation lever 51' is pivoted back to the restraining position "c" due to the force of the helical spring 39'. Under this condition, the latch plate 31' catching the striker 18 is suppressed from pivoting toward the stand-by position and the curved lower edge 61' of the operation lever 51' tightly abuts against the striker 18. That is, under this condition, the striker 18 is completely locked by the lock proper 3', as is shown in FIG. 9.

As is understood FIG. 12, under this locked condition, the striker 18 is stably supported by both the latch plate 31' and the lower curved edge 61' of the operation lever 51', that is, byway of three points, similar to the case of the above-mentioned first embodiment (see FIG. 6).

When, for the purpose of folding up the seat 7A, the operation lever 51' is pivoted clockwise in FIG. 9, the curved lower edge 61' of the operation lever 51' is disengaged from the striker 18. Due to provision of the given distance "α" left between the second raised lug 65' and the sector portion 57', at initial stage of the disengaging pivoting of the operation lever 51', the locking plate 33' is kept unmoved. That is, at the initial stage, the latched engagement between the latch plate 31' and the locking plate 33' is kept and thus the latched engagement between the latch plate 31' and the striker 18 is also kept.

When the clockwise pivoting of the operation lever 51' further proceeds, the second raised lug 65' is brought into abutment with the sector portion 57' and pushes the same. With this, the locking plate 33' is pivoted counterclockwise disengaging the pawl portion 45' thereof from the pawl portion 59' of the latch plate 31', and thus, with the aid of the force of the helical spring 39', the latch plate 31' is permitted to pivot toward the stand-by position releasing the striker 18. Thus, under this condition, the stand 19A (see FIG. 15) of the seat 7A can be folded up.

When thereafter the operation lever 51' is released, the lock device 100B assumes the above-mentioned rest condition.

In the following, advantages of the lock device 100B of the second embodiment will be described.

(1) Due to provision of the striker restraining base portion 35, the locked engagement between the striker 18 and the lock proper 3' is steadily made. Furthermore, in this embodiment, the biasing force applied to the striker 18 from the striker restraining base portion 35' is increased when the latch plate 31' is pivoted to the latch position "a". Thus, the striker 18 is much steadily and reliably held by the lock proper 3'.

(2) During operation of the operation lever 51' for canceling engagement between the lock proper 3' and the striker 18, separation of the striker restraining base portion 35' from the striker 18 takes place first and then lock canceling pivoting of the locking plate 33' takes place. Thus, smoothed pivoting of the operation lever 51' is achieved with a light force.

(3) In initial stage of return pivoting of the locking plate 33' for engagement with the latch plate 31', the pivoting is powered by both the springs 67' and 39'. Thus, such initial pivoting is strongly and quickly achieved. While, in final stage, the return pivoting of the locking plate 33' is powered by only the coil spring 67'. That is, before the final stage, the sector portion 57' of the locking plate 33' has separated from the first raised lug 63' of the striker restraining base portion 35' due to abutment of the curved lower edge 61' against the striker 18. This brings about a soft and silent engagement of the locking plate 33' with the latch plate 31'.

It is to be understood that, although the invention has been described with specific reference to particular embodiments thereof, it is not to be so limited since changes and alterations therein may be made which are within the full intended scope of this invention as defined by the appended claims.

What is claimed is:

1. A lock device comprising:
   a striker; and
   a lock proper including:
   a base member having a striker receiving slot for receiving said striker;
   a latch plate pivotally connected to said base member and pivotal between a latching position, where the latch plate latches the striker in said striker receiving slot, and a stand-by position, where the latch plate releases the striker;
   a locking plate pivotally connected to said base member and pivotal between a lock position, where said locking plate locks said latch plate in the latching position, and an unlock position, where the locking plate unlocks said latch plate;
   a striker restraining member pivotally connected through a first pivot shaft to said base member and having a contact edge, said striker restraining member being pivotal between a restraining position, where said contact edge abuts against the striker, and a releasing position, where said contact edge disengages from said striker;
   biasing means for biasing said latch plate to pivot toward said stand-by position, biasing said locking plate to pivot toward said lock position, and biasing said striker restraining member to pivot toward said restraining position; and
   link means cooperating with said locking plate for allowing said striker restraining member to take said restraining position when said latch plate is brought to said latching position,
   wherein said pivot shaft is positioned above said striker receiving slot, so that said contact edge of said striker restraining member abuts against a front side of said striker.

2. A lock device as claimed in claim 1, wherein said biasing means comprises first and second springs.

3. A lock device as claimed in claim 2, wherein said first spring is arranged between said latch plate and said locking plate to bias said latch plate to pivot toward said stand-by position and said locking plate to pivot toward said lock position, and wherein said second spring is arranged to bias said striker restraining member to pivot toward said restraining position.

4. A lock device as claimed in claim 3, wherein each of said latch plate and said locking plate has a pin, said first spring having one end hooked to the pin of said latch plate and the other end hooked to the pin of said locking plate, and wherein said second spring is a helical spring operatively disposed about said first pivot shaft.

5. A lock device as claimed in claim 2, wherein said first spring is arranged between said latch plate and said striker restraining member to bias said latch plate to pivot toward said stand-by position and said striker restraining member to pivot toward said restraining position, and wherein said second spring is arranged to bias said locking plate to pivot toward said lock position.

6. A lock device as claimed in claim 5, wherein said latch plate is pivotally connected to said base member through a second pivot shaft, said first spring is a helical spring, including a turned part disposed about said second pivot shaft, one end hooked to said latch plate and the other end hooked to said striker restraining member, and wherein said second spring has one end pressed against said locking plate and the other end pressed against said base member.

7. A lock device as claimed in claim 1, wherein said striker restraining member is arranged so that, when said latch plate fully latches against the striker, said contact edge of said striker restraining member intersects at right angles with an imaginary straight line passing through the center of said first pivot shaft and the center of said striker.

8. A lock device as claimed in claim 7, wherein said contact edge as a convex curve.

9. A lock device as claimed in claim 1, wherein said link means comprises a time-lug mechanism through which said locking plate and said striker restraining member are connected.

10. A lock device as claimed in claim 9, wherein said time-lug mechanism comprises:
    spaced first and second raised lugs provided by said striker restraining member; and
    a portion of said locking plate, said portion being positioned between said first and second raised lugs leaving a certain gap therebetween.

11. A lock device as claimed in claim 1, said locking plate is pivotally connected to said base member also through said first pivot shaft.

12. A lock device as claimed in claim 1, wherein said lock proper further comprises an operation lever integrally connected to said striker restraining member to pivot therewith.

13. A lock device as claimed in claim 1, wherein said biasing means comprises a spring arranged between said striker restraining member and said latch plate to bias said latch plate to pivot toward said stand-by position and said striker restraining member to pivot toward said restraining position, and wherein said link means comprises a time-lug mechanism through which said locking plate and said striker restraining member are connected.

14. A lock device as claimed in claim 1, wherein said link means comprises a time-lug mechanism through which said locking plate and said striker restraining member are connected and in which said locking plate is pivotally connected to said base member also through said first pivot shaft.

15. A lock device as claimed in claim 13, wherein said locking plate is pivotally connected to said base member also through said first pivot shaft.

16. A lock device as claimed in claim 14, wherein said striker restraining member is arranged so that, when said latch plate fully latches the striker, said contact edge of said striker restraining member intersects at right angles with an imaginary straight line passing through the center of said first pivot shaft and the center of said striker.

17. A lock device as claimed in claim 16, wherein said biasing means comprises a spring arranged between said striker restraining member and said latch plate to bias said latch plate to pivot toward said stand-by position and said striker restraining member to pivot toward said restraining position.

18. A lock proper for use with a striker, comprising:

a base member having a striker receiving slot for receiving the striker;

a latch plate pivotally connected to the base member and pivotal between a latching position, where the latch plate latches the striker in the striker receiving slot, and a stand-by position, where the latch plate releases the striker;

a locking plate pivotally connected to the base member and pivotal between a lock position, where the locking plate locks the latch plate in the latching position, and an unlock position, where the locking plate unlocks the latch plate;

a striker restraining member pivotally connected through a pivot shaft to the base member and having a contact edge, the striker restraining member being pivotal between a restraining position, where the contact edge abuts against the striker, and a releasing position, where the contact edge disengages from the striker;

biasing means for biasing the latch plate to pivot toward the stand-by position, biasing the locking plate to pivot toward the lock position, and biasing the striker restraining member to pivot toward the restraining position; and link means cooperating with the locking plate for allowing the striker restraining member to take the restraining position when the latch plate is brought to the latching position, wherein the pivot shaft is positioned above the striker receiving slot, so that the contact edge of the striker restraining member abuts against a front side of the striker.

* * * * *